June 1, 1926. 1,587,023
A. J. MOTTLAU
MULTIPLE REFLECTOR SINGLE UNIT COMBINED TOASTER AND COOKER
Filed Feb. 17, 1922 2 Sheets-Sheet 1
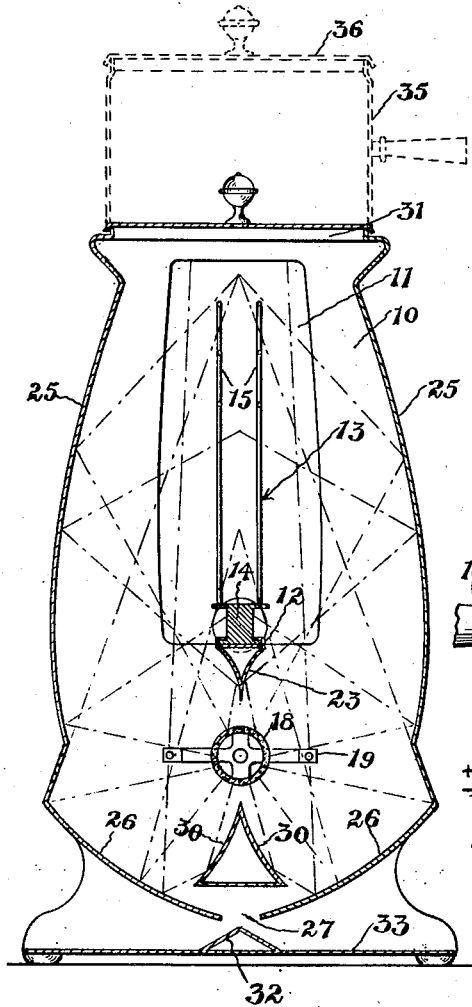
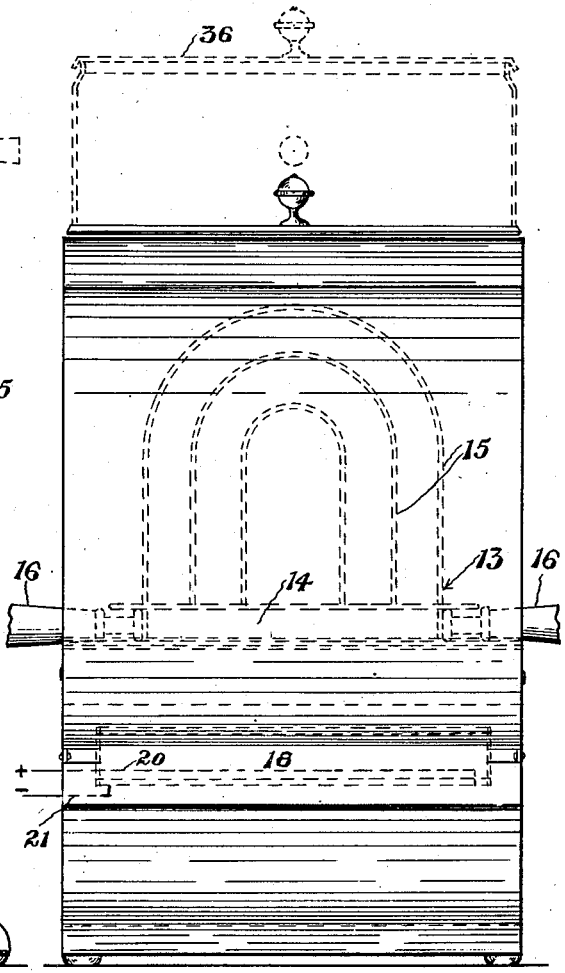

June 1, 1926.  1,587,023
A. J. MOTTLAU
MULTIPLE REFLECTOR SINGLE UNIT COMBINED TOASTER AND COOKER
Filed Feb. 17, 1922  2 Sheets-Sheet 2
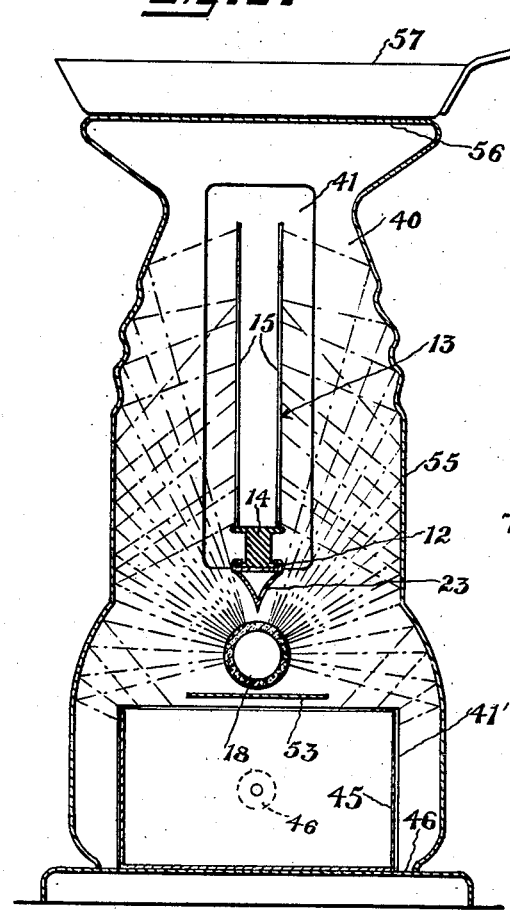
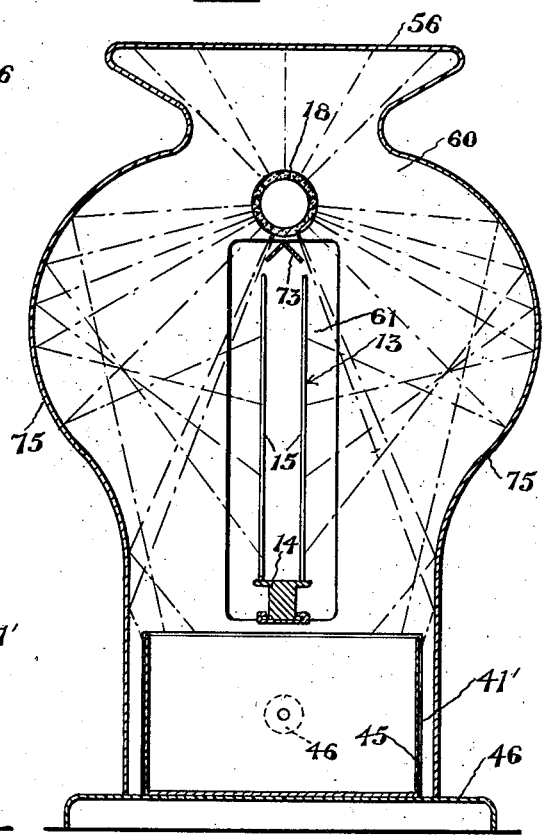

Patented June 1, 1926.

1,587,023

UNITED STATES PATENT OFFICE.

AUGUST J. MOTTLAU, OF PHILADELPHIA, PENNSYLVANIA, ASSIGNOR TO A. MECKY COMPANY, OF PHILADELPHIA, PENNSYLVANIA, A CORPORATION OF PENNSYLVANIA.

MULTIPLE-REFLECTOR SINGLE-UNIT COMBINED TOASTER AND COOKER.

Application filed February 17, 1922. Serial No. 537,294.

This invention relates to electric toasters or cookers or a combination of the two; though it is noted that the invention is not limited to electric appliances nor even, in some respects, to toasters or cookers.

One object of the invention is to provide an apparatus or device of this kind in which a single heating unit is made to toast or heat both sides of a piece of bread, or other material to cook or heat both sides of a vessel or the like.

Another object of the invention is to provide an apparatus or device of this kind in which a single heating unit is caused to heat material or utensils as above noted and also to heat an additional vessel or the like.

Another object of the invention is to provide an apparatus or device of this kind in which the rays from the heating unit will not be reflected back and forth between the reflectors but will in general be reflected only once, thus avoiding the over heating of the appliance.

Other objects of the invention are to improve generally the simplicity and efficiency of such devices and to provide a device or apparatus of this kind which is durable, economical to manufacture and operate and which will not get out of order.

Other objects of the invention will appear as the description proceeds; and while herein details of the invention are described, the invention is not limited to these, since many and various changes may be made without departing from the scope of the invention as claimed.

In the accompanying drawing, showing by way of example several of many possible embodiments of the invention, Figs. 1 and 2 are respectively a transverse vertical sectional view and a side elevation of one form of my appliance; and Figs. 3 and 4 are respectively transverse vertical sectional views of other forms of the invention.

The form of my appliance as shown in Figs. 1 and 2 comprises a pair of end walls 10 one or each provided with a large vertically elongated utensil receiving opening 11 in its upper part. Between said walls at the lower part of said opening is mounted a seat 12 for carrying a toast rack or other utensil 13 or other material holding means here shown comprising a support 14 slidable into said seat from either end and having upstanding toast retaining side members 15, and handles 16 at one or both ends.

A single elongated heating unit 18 (here shown only diagrammatically) mounted on brackets or the like 19 between said walls 10 below said utensil substantially in the plane thereof may comprise a tubular porcelain core and a fine wire helix coiled in the form of a larger helix and helically disposed around said core and connected by suitably arranged conductors 20 and 21 to a convenient source of current. A reflecting baffle 23 between said unit and said seat 12 prevents the over-heating at the bottom part of whatever is carried by the utensil.

Concaved main reflectors 25 disposed and secured between opposite edges of said walls on opposite sides of said unit and rack are formed to reflect a large portion of the heat rays from the single heating unit to both sides of the utensil. Supplementary reflectors 26 mounted between said walls below the main reflectors reflect the lower heat rays of the heating unit to the utensil. The supplementary reflectors are separated from each other beneath the unit to form a discharge opening 27 through which crumbs are discharged. Concaved baffle reflectors 30 mounted between the end walls over the opening 27 reflect rays from beneath the heating unit to the supplementary reflectors and thence to the utensil or to the upper opening 31 formed by the top edge of the end walls and main reflectors, thus preventing excessive discharge of heat through the opening 27. A further heat and crumb deflector 32 beneath the discharge opening further reduces the amount of heat passing from the opening 27. This protects the table, cloth or other support from injury by excessive heat, if the floor 33 be omitted. The floor 33 serves to catch crumbs or the like which may fall through discharge opening 27 and also helps to protect from heat; but this floor is not necessary and may be omitted.

A removable cooking vessel or utensil 35 is removably mounted over the upper opening 31 to utilize heat not thrown to the utensil 13 and is provided with a cover 36, said cover being itself adapted for mounting directly over said upper opening 31 when said removable utensil 35 is not used.

In the form of my appliance shown in Fig. 3 the end walls 40 are provided with large vertically elongated openings 41 in the upper part and also with wide lower openings 41' at the lower part. At the lower part of said openings 41 is mounted the seat 12 carrying the rack or upper utensil 13.

The heating unit 18 is disposed below said utensil and just above a utensil or vessel 45 carried on the floor 46 and slidable into place through the opening 41' by means of handles 46 at one or both ends. Baffles 23 and 53 between said unit and the utensils prevent the over heating of the latter. The main reflectors 55 are formed to reflect heat rays from the single heating unit to both sides of the upper utensil and also on and into the lower utensil 45.

The top wall 56 of this appliance is formed flat for the reception of a removable cooking utensil 57 or other device; but any of the appliances may be formed with either the flat top wall or an opening 31 as in Fig. 1, if desired.

In the form of my appliance shown in Fig. 4 the end walls 60 are at the mid part provided with large vertically elongated openings 61 and at the lower part with the wide lower openings 41'. The seat 12 carrying the rack or upper utensil 13 is mounted at the lower part of said openings 61.

The heating unit 18 is disposed just above said utensil 13 and therefore considerably above the utensil or vessel 45 carried on the floor 46 and slidable into place through the openings 41'. A baffle 73 between said unit 18 and the utensil 13 prevents over heating of material contained in the latter. The main reflectors 75 are formed to reflect heat rays from the single heating unit to both sides of the upper utensil and also into the lower utensil 45.

The top wall 56 of this appliance is here shown formed flat for the reception of a removable cooking utensil 57 or other device.

In all of the figures, the paths of the heat rays are represented by the dot-and-dash lines. It will be noted particularly of Figs. 1 and 4 that the reflectors on opposite sides of the unit and utensil in general reflect heat to both sides of the utensil but substantially away from the opposite reflector thus substantially to prevent multiple reflection of the same heat rays, and the consequent over heating of the appliance.

The operation of the appliance is simple and obvious. The article or material to be heated is placed in the rack 13 or any suitable receptacle placed on the seat 12, depending upon the nature of the material to be heated. The receptacle or the like is then put in place between the reflectors either before or after the current has been turned on.

As the openings 11, 41 or 61 are provided in both the end walls, any two of the utensils not provided with handles at both ends may be inserted in these openings and used at the same time.

Additional food to be heated may be placed in the vessels 35 or 45 or other utensils and cooked, heated or warmed the same time as the material in the rack 13 is heated.

Should the vessel 35 or other utensil be not used, on the appliance of Fig. 1, the cover 36 may be placed directly on the opening 31.

Other uses for the appliance and utensils will readily suggest themselves.

I claim:—

1. In a device of the character described, in combination, end walls; a pair of reflectors arranged in spaced front to front relation supported between the end walls and consisting of main reflecting portions and supplementary reflecting portions; means for containing material to be heated supported in the space formed between the end walls and the reflectors and provided with surfaces for receiving heat rays from the reflectors; and a heating unit supported in the space formed between the end walls and the reflectors and spaced away from said material containing means; the rays from the heating unit being reflected by said main reflecting portions to said surfaces and the rays from the heating unit being reflected by said supplementary portions in directions whereby said rays are prevented from being reflected back to the heating unit.

2. In a device of the character described, in combination, end walls; a pair of reflectors arranged in spaced front to front relation supported between the end walls and constituting side walls for the device and consisting of main reflecting portions and supplementary reflecting portions; means for containing material to be heated supported in the space formed between the end walls and the reflectors and provided with side surfaces for receiving heat rays from the reflectors; and a heating unit supported in the space formed between the end walls and the reflectors and spaced away from said material containing means; the rays from the heating unit being reflected by said main reflecting portions to both said heat receiving side surfaces and the rays from the heating unit being reflected by said supplementary portions in directions whereby said rays are prevented from being reflected back to the heating unit.

3. In a device of the character described, in combination, end walls; a pair of reflectors arranged in spaced front to front relation supported between the end walls and consisting of main reflecting portions and supplementary reflecting portions; means for containing material to be heated supported in the space between the end walls and the reflectors and provided with surfaces for receiving heat rays from the reflectors; a heating unit supported in the space formed between the end walls and the reflectors and spaced away from said material containing means; and heat ray baffle means disposed between said material containing means and the heating unit; the rays from said heating unit being reflected by said main reflecting portions to said surfaces and the rays from the heating unit being reflected by said supplementary portions in directions whereby said rays are prevented from being reflected back to the heating unit.

4. In a device of the character described, in combination, end walls; a pair of reflectors arranged in spaced front to front relation supported between the end walls and consisting of main reflecting portions and supplementary reflecting portions; means for containing material to be heated supported in the space formed between the end walls and the reflectors and provided with side surfaces for receiving heat rays from the reflectors and extending longitudinally of said space; a heating unit supported in said space and spaced away from said material containing means; and means for containing material to be heated having a heat receiving surface extending transversely of the space formed between the end walls and the reflectors and spaced away from the heating unit; said main reflecting portions providing means for reflecting heat rays from the heating unit to said side surfaces of the first means for containing material and said supplementary portions providing means for reflecting heat rays from said unit to the heat receiving surface of the second means for containing material.

5. In a device of the character described, in combination, end walls for the device; a pair of reflectors arranged in spaced front to front relation between the end walls and forming side walls for the device and consisting of main reflecting portions and supplementary reflecting portions; means for containing material to be heated supported in the space formed between the end walls and the reflectors and provided with side surfaces for receiving heat rays from the reflectors and extending longitudinally of said space; a heating unit supported in said space and spaced away from said material containing means; and means for containing material to be heated having a heat receiving surface extending transversely of the space formed between the end walls and the reflectors and spaced away from the heating unit; said main reflecting portions providing means for reflecting heat rays from the heating unit to said side surfaces of the first means for containing material and said supplementary portions providing means for reflecting heat rays from said unit to the heat receiving surface of the second means for containing material.

6. In a device of the character described, in combination, end walls for the device; a pair of reflectors arranged in spaced front to front relation between the end walls and forming side walls for the device and consisting of main reflecting portions and supplementary reflecting portions; means for containing material to be heated supported in the space formed between the end walls and the reflectors and provided with side surfaces for receiving heat rays from the reflectors and extending longitudinally of said space; a heating unit supported in said space and spaced away from said material containing means; heat ray baffle means located between said means for containing material and the heating unit; and means for containing material to be heated having a heat receiving surface extending transversely of the space formed between the end walls and the reflectors and spaced away from the heating unit; said main reflecting portions providing means for reflecting heat rays from the heating unit to said side surfaces of the first means for containing material and said supplementary portions providing means for reflecting heat rays from said unit to the heat receiving surface of the second means for containing material.

7. In a device of the character described, in combination, a pair of reflectors arranged in spaced front to front relation and consisting of main reflecting portions and supplementary reflecting portions; a first means for containing material to be heated; and a second means for containing material to be heated; said main reflecting portions providing means for reflecting rays upon the first means for containing material and said supplementary portions providing means for reflecting rays upon the second means for containing material.

8. In a device of the character described, in combination, a pair of end walls each having an opening in its upper part; a seat disposed between said walls at the lower ends of said openings; means for containing material to be heated having side members spaced apart and providing heating areas, said means being insertable through either of said openings and engageable with said seat for support thereby; a heating unit beneath said seat; and a pair of reflectors one on each side of said unit, each reflector consisting of a main portion for reflecting heat from said unit to a side member of said means for containing material and a supplementary portion for reflecting heat from said unit in directions whereby said heat is prevented from being reflected back to the heating unit.

9. In a device of the character described, in combination, a pair of end walls each having an opening in its upper part; a seat disposed between said walls at the lower ends of said openings; means for containing material to be heated having side members spaced apart and providing heating areas, said means being insertable through either of said openings and engageable with said seat for support thereby; a heating unit beneath said seat; heat baffle means disposed between said means for containing material and the heating unit; and a pair of reflectors one on each side of said unit, each reflector consisting of a main portion for reflecting heat from said unit to a side member of said means for containing material and a supplementary portion for reflecting heat from said unit in directions whereby said heat is prevented from being reflected back to the heating unit.

10. An appliance comprising a utensil; a heating means; reflectors cooperating to reflect lower heat rays of said means to the utensil; said reflectors being separated to form a discharge opening; and heat and crumb deflectors beneath said opening.

11. In combination, a pair of end walls; a seat mounted between said walls; a utensil thereon; a single heating unit beneath said seat; concaved reflectors disposed between opposite edges of said walls on opposite sides of said unit and forming an upper opening with said end walls and formed to reflect heat rays from the single unit to both sides of the utensil.

AUGUST J. MOTTLAU.